(12) United States Patent
Lee et al.

(10) Patent No.: US 7,256,916 B2
(45) Date of Patent: Aug. 14, 2007

(54) OPTICAL SCANNING IMAGING SYSTEM

(75) Inventors: Ju-hyun Lee, Seoul (KR); Yong-kweun Mun, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 27 days.

(21) Appl. No.: 11/347,255

(22) Filed: Feb. 6, 2006

(65) Prior Publication Data
US 2006/0175545 A1    Aug. 10, 2006

(30) Foreign Application Priority Data
Feb. 7, 2005    (KR) ............... 10-2005-0011415

(51) Int. Cl.
    *G02B 26/08* (2006.01)
(52) U.S. Cl. ............ 359/196; 359/204; 359/205; 359/258; 372/70
(58) Field of Classification Search ............ 359/196, 359/204, 205, 258; 347/255; 372/69–91
See application file for complete search history.

(56) References Cited

U.S. PATENT DOCUMENTS

| 5,715,021 A | 2/1998 | Gibeau et al. |
| 5,757,549 A * | 5/1998 | Sumi ............ 359/618 |
| 5,892,556 A | 4/1999 | Deter |
| 6,351,324 B1 * | 2/2002 | Flint ............ 359/202 |
| 6,636,339 B2 | 10/2003 | Lee |
| 6,700,598 B1 * | 3/2004 | Hull ............ 347/238 |

OTHER PUBLICATIONS

J. Reintjes et al., Direct Observation of the Orientational Kerr Effect in the Self-Focusing of Picosecond Pulses, Physical Review Letters, vol. 28, No. 26, Jun. 26, 1972, pp. 1697-1700, XP-002376386.
M. Vampouille et al., Application of Controlled Self-Focusing in CS2 to Shortening Picosecond Laser Pulses, Optical and Quantum Electronics, vol. 14, No. 3, May 1982, pp. 253-261, XP-001246753.
Mansoor Sheik-Bahae et al., Sensitive Measurement of Optical Nonlinearities Using a Single Beam, IEEE Journal of Quantum Electronics, vol. 26, No. 4, Apr. 1, 1990, pp. 760-769, XP 000149716.
European Search Report dated May 3, 2006.

* cited by examiner

*Primary Examiner*—Stephone B. Allen
*Assistant Examiner*—Jennifer Doak
(74) *Attorney, Agent, or Firm*—Buchanan Ingersoll & Rooney PC

(57) ABSTRACT

The system includes an illumination system, a scanner, a non-linear optical element, and a pumping light source. The illumination system emits imaging beam and the scanner scans the beam incident from the illumination system. The non-linear optical element is made of a material having a Kerr effect or the like and forms a lens automatically aligned while following a path of the imaging beam scanned from the scanner. The pumping light source actives the non-linear optical element to cause a non-linear refractive index change of the non-linear optical element.

35 Claims, 8 Drawing Sheets

OBJECT PLANE

OLD OBJECT PLANE     NEW OBJECT PLANE

OPTICAL SCANNING IMAGING SYSTEM

CROSS-REFERENCE TO RELATED PATENT APPLICATION

Priority is claimed to Korean Patent Application No. 10-2005-0011415, filed on Feb. 7, 2005, in the Korean Intellectual Property Office, the disclosure of which is incorporated herein in its entirety by reference.

BACKGROUND OF THE INVENTION

1. Field of the Invention

The present invention relates to an optical scanning imaging system, and more particularly, to an optical scanning imaging system capable of improving resolution.

2. Description of the Related Art

As multimedia-oriented society emerges rapidly, a large-sized and high quality display screen is required. Recently, emphasis is put on realization of natural color in addition to high resolution.

A light source such as a laser having high color purity should be used to realize perfect natural colors. One of apparatus realizing a screen using a laser is an optical scanning laser imaging system using a scanner. An optical scanning laser imaging system has mainly used a polygonal rotating mirror and a galvanometer mirror. The optical scanning laser imaging system using the polygonal rotating mirror or the galvanometer mirror is difficult to manufacture in a small size and a unit price thereof is high.

Considering above problems, the present applicant has suggested a laser imaging system using a scanner adopting a microelectromechanical system (MEMS), which is disclosed in a U.S. Pat. No. 6,636,339.

The laser imaging system using the MEMS scanner is one of promising projection display devices of small form factor, low power consumption, and natural color realization.

To realize a laser imaging system of a large-sized screen and high resolution by applying the MEMS scanner, a sufficient scanning speed, a wide scanning angle, and a large mirror size are required.

Since a laser beam is coherent light and diffraction occurs much while the laser beam propagates as the width of the laser beam is small, it is difficult to make the width of the laser beam infinitely small. Also, as is well known in the art, a light beam is not focused as a point due to diffraction nature thereof and thus there exists a limit of resolution. In addition, when the size of a light beam incident to a lens system is large, the size of the light beam focused gets small.

Therefore, it is required to make the size of the unfocused light beam large so as to raise resolution. A large scanning frequency and a large value θD are required to realize an image of high resolution. Image resolution of a laser beam scanning optical system is determined by an optical invariant represented by a product θD of the diameter D of a collimated beam and a beam scanning angle θ.

The performance of a raster scanning system is defined by θD [deg·mm]. A VGA class and a XGA class require θD of about 7.50 and about 12.0, respectively. It is known that a product θD of about 22.5 is required to realize a high definition class display. θ is a mechanical scanning angle (unit: degree) of a scanner in one direction and D is the width of a beam, i.e., the effective mirror size (unit: mm) of the scanner in a laser scanning apparatus.

To realize a high resolution imaging system, the mirror size of the MEMS scanner should be large. Also, to realize a large-sized, high resolution laser imaging system, a scanning speed should be fast.

However, when the mirror size is increased, it is difficult to make a maximum operation speed of the MEMS scanner fast due to a physical property such as the moment of inertia, so that a scanning speed gets slow. Therefore, it is difficult to make the mirror size large while making the scanning speed fast.

Also, it is impossible to make a scanning angle of the MEMS scanner infinitely large and thus the scanning angle is limited.

To realize a subminiature high performance laser beam projection display, the MEMS scanner capable of scanning in high speed is considered as a reliable beam scanning device, but it is not easy to design a high speed MEMS scanner realizing a high resolution image due to trade-off relationship between an operation speed, an operation angle, and a reflection mirror size in device design. Therefore, it is difficult to obtain an MEMS scanner capable of accomplishing a sufficient scanning speed and scanning angle to realize a high definition, high resolution display while meeting a sufficient mirror size using a current MEMS manufacturing technique.

SUMMARY OF THE INVENTION

The present invention provides an optical scanning imaging system capable of improving resolution without increasing the size of a scanning surface.

According to an aspect of the present invention, there is provided an optical scanning imaging system including: an illumination system emitting an imaging beam; a scanner scanning the beam incident from the illumination system; a non-linear optical element made of a material having a Kerr effect and forming a lens automatically aligned while following a path of the imaging beam scanned by the scanner; and a pumping light source causing non-linear optical refractive index change forming a lens in the non-linear optical element while following the path of the imaging beam by activating the non-linear optical element.

The non-linear optical element may have a shape following an arc of a circle whose center coincides with a center of an axis of the scanner.

The illumination system may be a laser illumination system using a laser light source.

The illumination system may be formed to emit a plurality of laser beams for each wavelength including R, G, and B laser beams modulated according to an image signal through a single optical path.

The pumping light source may be a laser light source.

A pumping beam emitted from the pumping light source may be incident to the scanner through the same optical path as that of the imaging beam.

The pumping light source may emit a pumping beam having a wavelength different from a wavelength of the imaging beam emitted from the illumination system.

The system may further include a pumping beam modulator disposed on a path of a pumping beam emitted from the pumping light source and modulating an intensity of the pumping beam so as to adjust a focal length of the lens formed by the non-linear optical element.

An optical scanning imaging system including at least one of the above-described characteristics may be applied to an optical scanning apparatus.

An optical scanning imaging system including at least one of the above-described characteristics may be applied to a projection apparatus so as to form a projection image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Assuming that the diameter of a scanner mirror plane is D, the incident angle of a light beam incident on the mirror plane of a scanner is δ, the effective diameter Dmin of the scanner is given by Dmin=D cos δ. Assuming that a resolvable angle limit of a light beam scanned by the scanner is θmin, the resolvable angle limit is given by θmin=1.22λ/Dmin for a circular light beam and θmin=λ/Dmin for a square light beam.

Assuming that a maximum tilt angle of the scanner mirror plane is ±θmax, the maximum resolvable theoretical number of pixels N for a circular light beam can be given by the following equation 1.

$$N = 2\theta_{max}/\theta_{min} \quad \text{(Eq. 1)}$$
$$= 2\theta_{max}/(1.22\lambda/D_{min})$$
$$\propto \theta_{max}D_{min}$$

Figure 1:
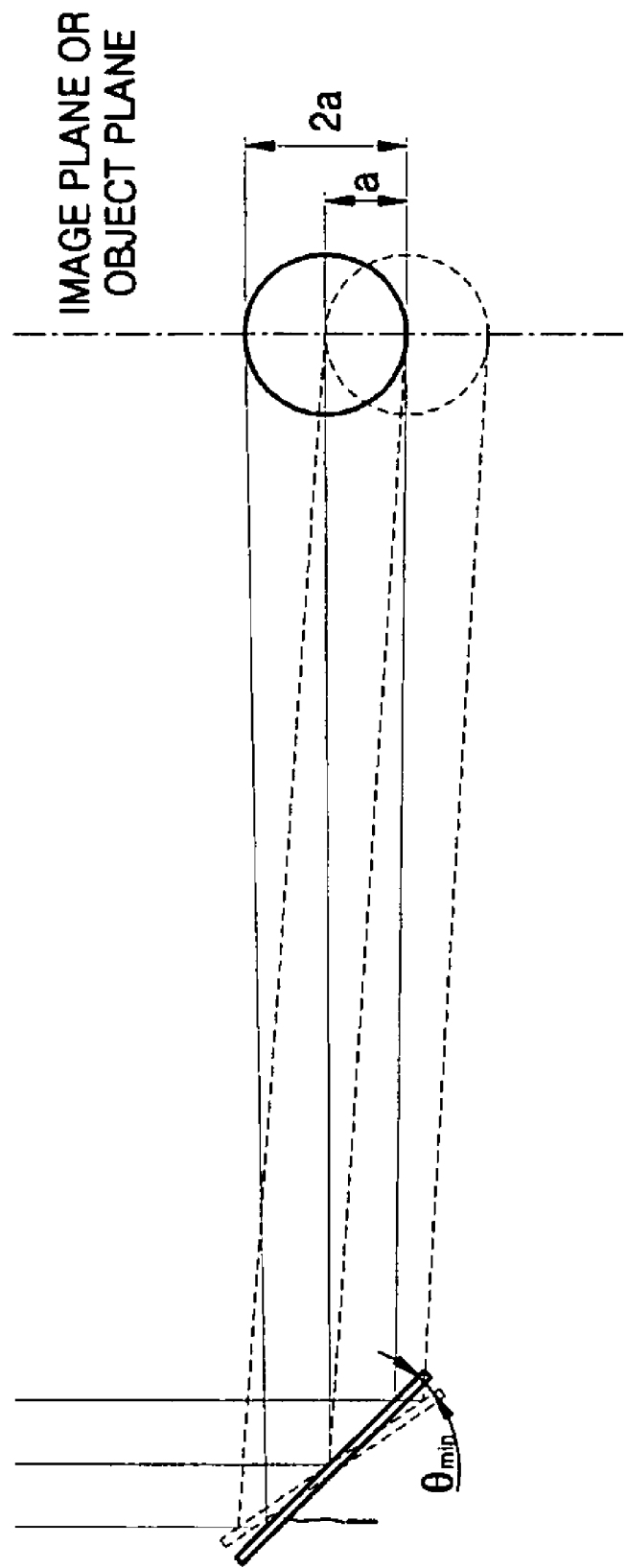
FIG. 1 is a view defining a minimum resolvable unit pixel.

FIG. 1 is a view defining a minimum resolvable unit pixel.

Referring to FIG. 1, assuming that a spot radius of a light beam reflected by a scanner 1 and illuminated on an image plane or an object plane is 'a', a limit resolvable angle θmin of the light beam illuminated by the scanner 1 means an angle such that an interval between centers of the spot is spaced as much as 'a'. Also, the size of a resolvable minimum unit pixel corresponds to a radius of a light beam spot illuminated on an image plane or an object plane. Here, the image plane may be a screen of a projection system or an imaging plane of an imaging system using an optical scanning device, e.g., a photosensitive medium plane of a printing device. The object plane may correspond to a position on which imager such as an LCD is disposed in a projection system.

Figure 2:
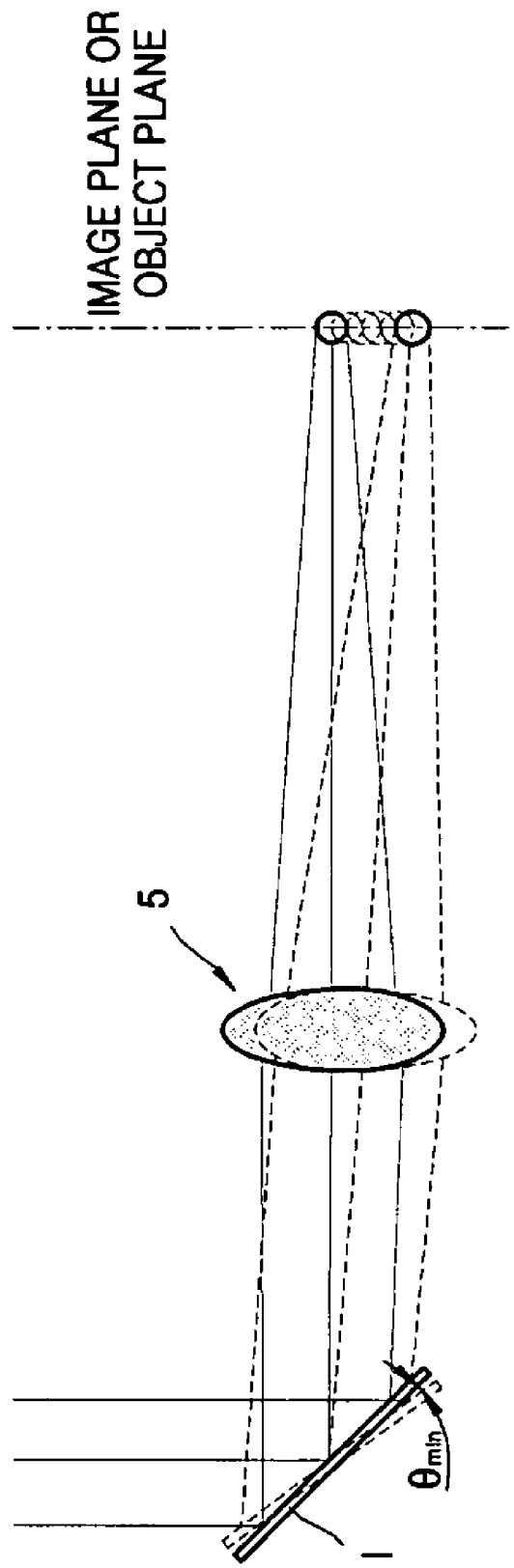
FIG. 2 is a view illustrating a concept of improving resolution according to exemplary embodiments of the present invention.

FIG. 2 is a view illustrating a concept of improving resolution according to the present invention.

Referring to FIG. 2, the present invention can form a light spot on an image plane or an object plane with improved resolution higher than limit of resolution determined by the scanner 1 by providing an optical system, i.e., a lens member 5 improving resolution between the scanner 1 and the image plane or the object plane.

As described later, the lens member 5 can includes a non-linear optical element made of a material having a Kerr effect and forming a lens automatically aligned while following a path of imaging beam scanned by the scanner. The lens member 5 is illustrated in the form of a lens in FIG. 5, which illustrates only a functional shape.

In comparison with FIG. 1, when the lens member 5 improving resolution is disposed between the scanner 1 and the image plane or the object plane as illustrated in FIG. 2, several resolvable light beam spots can be formed on the image plane or the object plane while the scanner 1 rotates by θmin, so that an image can be resolved as the greater number of minimum unit pixels compared with FIG. 1. That is, when the lens member 5 is provided as illustrated in FIG. 2, it is possible to make the size of the minimum unit pixel smaller than the case in FIG. 1. Therefore, it is possible to improve resolution of an optical scanning imaging system by employing certain embodiments of the present invention.

Figure 3:
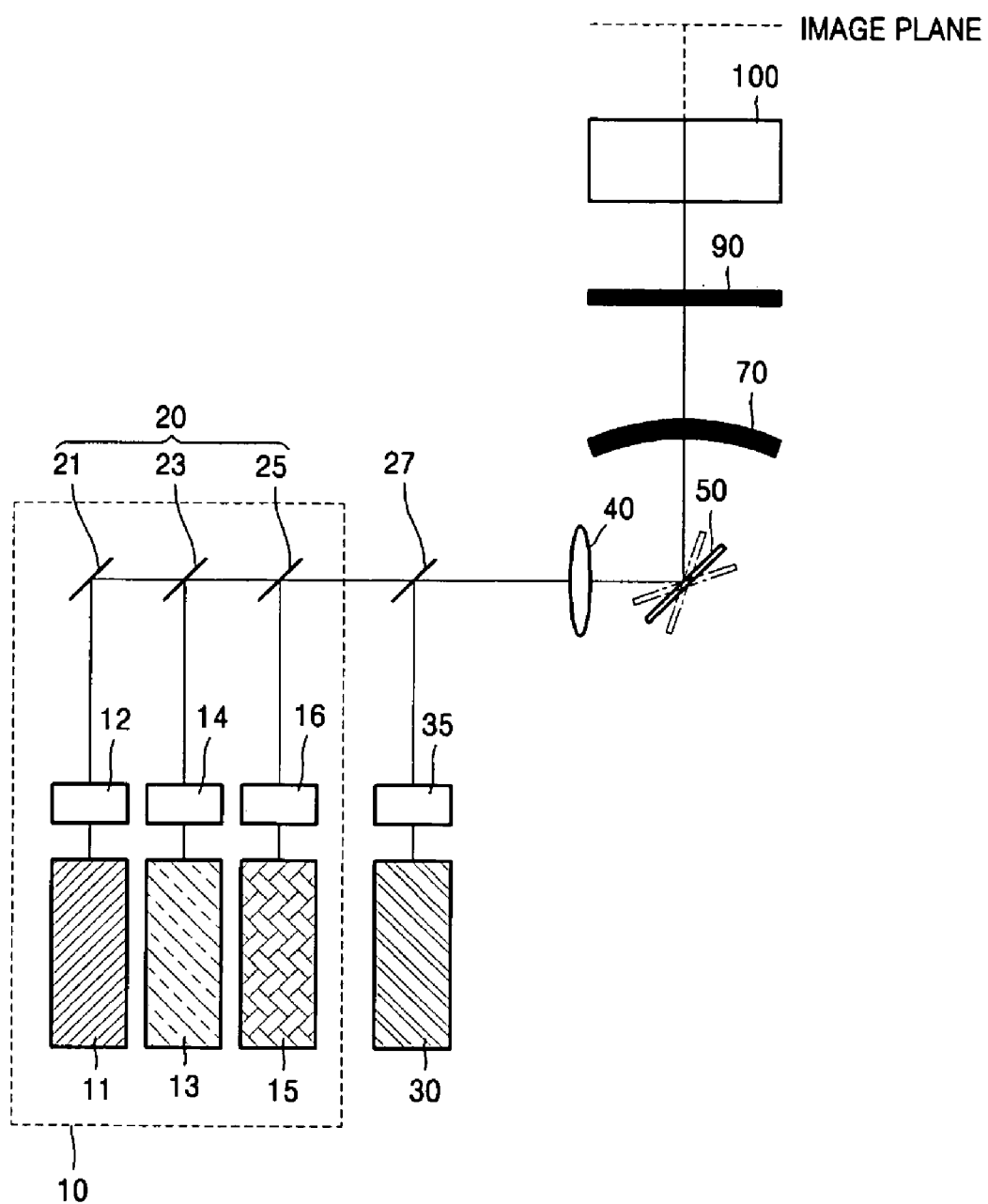
FIG. 3 is a schematic view of an optical scanning imaging system according to one embodiment of the present invention.

FIG. 3 is a schematic view of an optical scanning imaging system according to one embodiment of the present invention.

Referring to FIG. 3, an optical scanning imaging system according to one embodiment of the present invention includes an illumination system 10 emitting a visual light beam used to form image, a scanner 50 scanning a beam incident from the illumination system 10, at least one non-linear optical element 70, e.g., a Kerr lens, and a pumping light source 30 activating the non-linear optical element 70. The non-linear optical element 70 is made of a material having a Kerr effect and forms a lens automatically aligned while following a path of an imaging beam scanned by the scanner 50. A beam image scanned by the scanner 50 is formed on an image plane (or screen) by a projection optical system 100.

The illumination system 10 may be a laser illumination system using a laser light source. Referring to FIG. 3, the illumination system 10 can include a plurality of laser light sources emitting laser light for each wavelength through different optical paths and a color light coupler 20 coupling optical paths of the laser light emitted from the laser light sources and having the different wavelengths.

The laser light sources can include the first through third laser light sources 11, 13, and 15 separating optical paths of R, G, and B laser light and outputting the same.

The first through third laser light sources 11, 13, and 15 can be a solid laser or a semiconductor laser. Beam intensity modulators 12, 14, and 16 modulating laser beams of respective wavelengths according to an image signal can be disposed in front of the first through third laser light sources 11, 13, and 15.

Here, the first through third laser light sources 11, 13, and 15 can be a semiconductor laser emitting laser beams of R, G, and B wavelengths, modulating a laser beam output of the respective wavelengths according to an image signal, and outputting the same. In that case, the beam intensity modulators 12, 14, and 16 illustrated in FIG. 3 are omitted.

The color light coupler 20 can include the first through third dichromatic mirrors 21, 23, and 25, for example. Referring to FIG. 3, the first dichromatic mirror 21 reflects a red laser beam R emitted from the first laser light source 11. The second dichromatic mirror 23 reflects a green laser beam G emitted from the second laser light source 13 and transmits the red laser beam R incident from the side of the first dichromatic mirror 21 to match optical paths of the red and green laser beams R and G. The third dichromatic mirror 25 reflects a blue laser beam B emitted from the third laser light source 15 and transmits the red and green laser beams R and G incident from the side of the second dichromatic mirror 23 to match optical paths of the red, green, and blue laser beams R, G, and B. By the color light coupler 20, optical paths of the red, green, and blue laser beams R, G, and B emitted from the first through third laser light sources 11, 13, and 15 are merged into one and provided to the scanner 50. Here, a total reflection mirror can be disposed instead of the first dichromatic mirror 21.

The illumination system 10 using the laser light source emits a plurality of laser beams for each wavelength, e.g., R, G, and B laser beams modulated according to an image signal through a single optical path.

Here, FIG. 3 illustrates the illumination system 10 has three laser light sources emitting R, G, and B laser light, which is just exemplary, and the construction of the illumination system 10 can be modified in various ways.

The scanner 50 may be a scanner capable of scanning an incident beam in both directions. As an alternative, the scanner 50 can be a scanner scanning in one direction. The scanner capable of scanning in both directions can be an MEMS scanner or a galvanometer mirror scanner. The scanner capable of scanning in one direction can be a polygonal rotating mirror having a plurality of scanning mirror planes. FIG. 3 exemplarily illustrates a MEMS scanner is used for the scanner 50.

Since not only a beam for forming image from the illumination system 10 but also a pumping beam from the pumping light source 30 is incident on the scanner 50, preferably, the mirror plane may be total reflection-coated so that the mirror plane of the scanner 50 may not be damaged by pumping beam power of high intensity.

The projection optical system 100 can be an image relay optical system such as a projection lens unit. Also, the projection optical system 100 can include an f-θ lens.

The optical scanning imaging system of the present invention can be applied to an optical apparatus such as a projection apparatus or an optical scanning apparatus.

That is, the optical scanning imaging system can be used for a projection apparatus having an image relay optical systems as the projection optical system 100 to form one-dimension or two-dimension projection image, e.g., a projection display such as a projector or a projection television, or a head-mount display system forming an image on the retina of a user. Since the projection lens unit is well known in the art of a projection apparatus, detailed description thereof will be omitted.

Also, the optical scanning imaging system according to the present invention may have an f-θ lens as the projection optical system 100 so as to be used as an optical scanning apparatus of an image forming apparatus such as a printer. At this point, the optical scanning apparatus scans an image in both directions.

The non-linear optical element 70 is made of a material representing a Kerr effect in this exemplary embodiment. The Kerr effect means that when light of strong intensity is incident to a material having a large third-order non-linear optical coefficient, a refractive index of the material changes in proportional to the intensity of the light.

Figure 4:
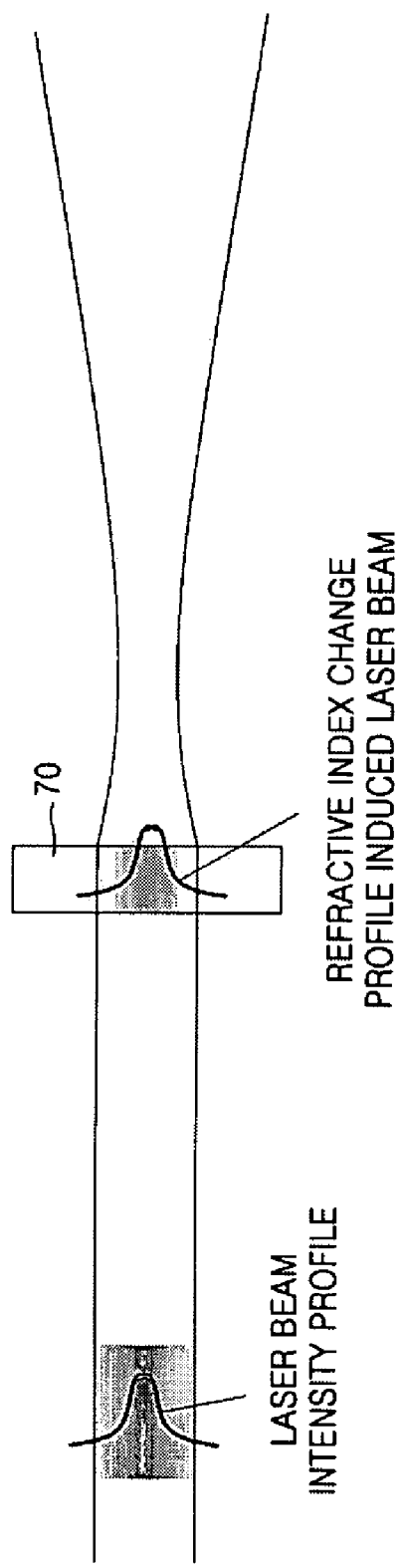
FIG. 4 is a view explaining a self-focusing principle or a self-defocusing principle in a non-linear optical element made of a material representing a Kerr effect.

FIG. 4 is a view explaining a self-focusing principle or a self-defocusing principle in a non-linear optical element 70 made of a material representing a Kerr effect. Only part of the non-linear optical element 70 is illustrated in FIG. 4.

Referring to FIG. 4, when a beam having a spacial intensity profile, e.g., a pumping beam from the pumping light source 30 is incident on the non-linear optical element 70 made of a material representing the Kerr effect, a refractive index change of the medium has a spacial distribution that corresponds to that spacial intensity profile. When the intensity profile of the beam is axially symmetric and has a proper distribution in a radial direction, the size of an induced non-linear refractive index change amount $\Delta n(r)$ is also proportional to an intensity profile $l(r)$ of the light. Here, 'r' represents a distance from a central axis of a beam.

FIG. 4 illustrates refractive index change distribution similar to a gaussian distribution is induced to the non-linear optical element 70 when a beam incident on the non-linear optical element 70 is a laser light of a gaussian $TEM_{00}$ mode. The medium of the non-linear optical element 70 serves as a convex (or concave) lens through the above-described induced non-linear refractive index change amount, which is called a self-focusing (or self-defocusing). In FIG. 4, when a parallel beam having an intensity profile of a gaussian $TEM_{00}$ mode is incident on the non-linear optical element 70, the non-linear optical element 70 serves as a convex lens through a self-focusing.

When the non-linear refractive index change amount $\Delta n(r)$ is positive, i.e., when a refractive index gets large in proportional to the intensity of light, the non-linear optical element 70 serves as a convex lens. On the contrary, when the non-linear refractive index change amount $\Delta n(r)$ is negative, i.e., when a refractive index gets large in inversely proportional to the intensity of light, the non-linear optical element 70 serves as a concave lens.

Therefore, it is possible to allow the non-linear optical element 70 to serve as either a convex lens or a concave lens by properly selecting a material used for the non-linear optical element 70.

In the meantime, the non-linear optical element 70 in the optical scanning imaging system according to the present invention may have a shape which follows an arc of a circle whose center matches with a center of a rotation of the scanner 50 so as to minimize distortion of a beam path as illustrated in FIG. 3.

The pumping light source 30 may be a laser light source. Also, the pumping light source 30 may emit a pumping beam of a wavelength different from a wavelength of the imaging beam emitted from the illumination system 10.

In the optical scanning imaging system according to the present invention, the pumping beam is incident on the scanner 50 along a path that coincides with an imaging beam and thus the pumping beam may be illuminated on the non-linear optical element 70 while following the path of the imaging beam.

For that purpose, the optical scanning imaging system according to the present invention can further include an optical path coupler, e.g., a dichromatic mirror 27 reflecting a pumping beam emitted from the pumping light source 30 and transmitting a beam from the illumination system 10 to merge the above optical paths.

In that case, the pumping beam is incident on the scanner 50 along a path that coincides with the imaging beam and scanned by the scanner 50 to generate a non-linear optical refractive index change to the non-linear optical element 70 while following the path of the imaging beam. By above process, the non-linear optical element 70 serves as a lens while following the path of the imaging beam.

Figure 5:
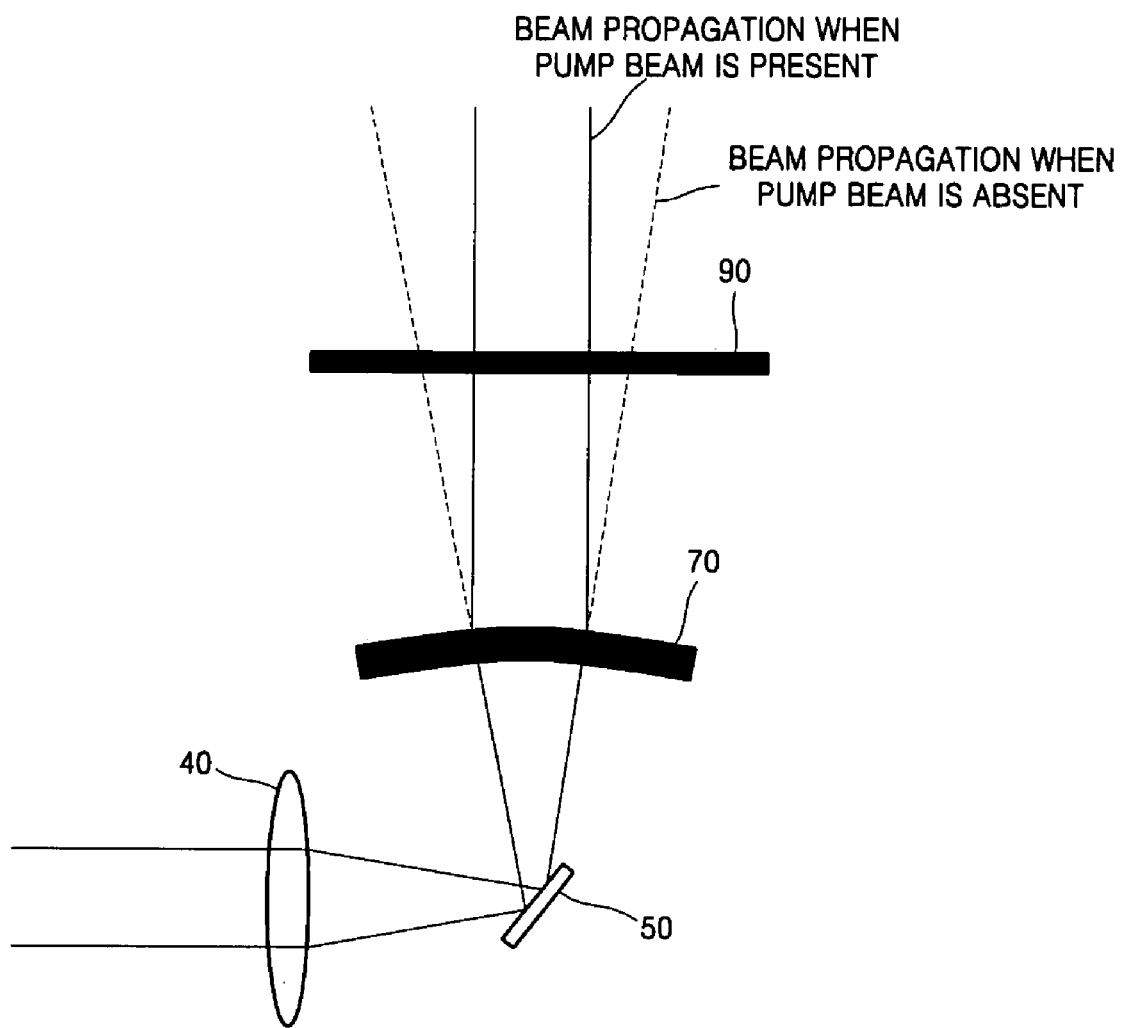
FIG. 5 is a view illustrating path changes of a beam passing through a non-linear optical element when a pumping beam is absent and when a pumping beam is present.

FIG. 5 is a view illustrating path changes of a beam passing through a non-linear optical element when a pumping beam is absent and when a pumping beam is present. As illustrated in a dotted line in FIG. 5, the non-linear optical element 70 dose not serve as a lens when the pumping beam is absent, so that a diverge angle of the beam does not change at all. On the contrary, as illustrated in a solid line in FIG. 5, when the pumping beam is illuminated to generate the non-linear refractive index change that forms a lens at the non-linear optical element 70, the non-linear optical element 70 serves as a lens, so that a diverge angle of the beam changes. In FIG. 5, a beam diverging from the side of the scanner 50 is incident on the non-linear optical element 70, which serves as a convex lens condensing the incident diverging beam.

In the above optical scanning imaging system according to the present invention, the non-linear optical element 70, i.e., the Kerr lens may be made of a material of readily reacting to the wavelength of the pumping beam so as to generate the non-linear refractive index change that forms a lens, but not representing a non-linear property with respect to the imaging beam (e.g., R, G, and B beams). That is, it is preferable that the non-linear optical element 70 is made of a material having wavelength selectivity that does not represents a lens effect in a wavelength range and an intensity range of the imaging beams.

A physical origin generating the Kerr effect includes several factors (thermal factor, molecular reorientation, electronic factor, and so on). Since a high pixel frequency that corresponds to an image pixel is required so as to realize a high resolution image, a Kerr medium having a high speed response time is advantageous. Generally, a response time of a material having a thermal physical origin is longest, a response time of a material having a physical origin of a molecular reorientation has a middle speed, and a response time of a material having an electronic physical origin is shortest. Therefore, it is most desirable that a Kerr material having an electronic physical origin is used for the non-linear optical element 70 in viewpoint of a response time.

It is preferable that the non-linear optical element 70 has a non-linear wavelength selection characteristic for the imaging visual laser beam and the pump laser beam and is made of a material transparent for visual light and causing a refractive index change for visual light. Also, it is preferable that the non-linear optical element 70 is made of a material having a high third-order non-linear optical coefficient having a sufficiently short response speed of a non-linear optical characteristic and causing a sufficient non-linear optical refractive index change in a pumping beam power region.

The pumping light source 30, i.e., the pumping laser should have light power of a level capable of causing a sufficient optical refractive index change to the non-linear optical element 70 and have a wavelength different from the imaging beams. Also, it is preferable that the pumping light source 30 may attach a pumping beam intensity modulator 35 thereon so as to adjust a focal length of a lens formed by the non-linear optical element 70.

A medium representing a Kerr effect used for forming the non-linear optical element 70 and an appropriate pumping light source thereof are as follows: CS2 (liquid carbon disulfide)+Nd:YAG pump laser, semiconductor gain medium+continuous wave (cw) or pulse type Nd:YAG laser, pure nematic liquid crystals (NLCs) or dye (or C60)-doped NLCs+cw visual light/UV laser, inorganic doped hybrid glass+visual laser.

Since an interval between the non-linear optical element 70 and the image plane, e.g., a screen changes depending on a distance from a scanning central axis, a spot size over an entire image plane changes depending on the distance of the scanning central axis in the case where a focal length of a lens formed by the non-linear optical element 70 is constant. For example, a spot size on the edge of the image plane is larger than a spot size on the center of the image plane because an image plane in the edge of the image plane is located past a focus when the non-linear optical element 70 has a focal length such that a focus is located at the center of an image plane.

Therefore, to maintain a fixed spot size over the entire image plane, it is preferable that the optical scanning imaging system according to the present invention may adjust a focal length of the non-linear optical element 70 so as to form the same size spot at any position on the image plane by controlling the pumping beam intensity.

For that purpose, an optical scanning imaging system according to the present invention may further include a pumping beam modulator 35 modulating a pumping beam intensity to adjust a focal length of the non-linear optical element 70 so that the same size spot may be formed at any position on the image plane by controlling the pumping beam intensity. By the pumping beam modulator 35, a fixed spot size can be maintained over the entire image plane.

Since the intensity of the pumping beam illuminated on the non-linear optical element 70 can be modulated so that the same size spot may be formed at any position on the image plane by a simple structure of adding the pumping beam modulator 35, the optical scanning imaging system according to the present invention does not require a complicated correcting optical system so as to solve the problem of the spot size change and thus an optical construction thereof is simple.

In the meantime, an optical scanning imaging system according to the present invention may further include a pumping beam cutter 90 between the non-linear optical element 70 and the projection optical system 100 so as to remove the pumping beam that has passed through the non-linear optical element 70. Since the wavelength of the pumping beam is different from that of the imaging beam, the pumping beam cutter 90 can have a band edge filter transmitting the imaging beam and cutting off the pumping beam.

Also, referring to FIG. 3, the inventive optical scanning imaging system can further include a condensing lens 40 on an optical path before the scanner 50 so as to reduce a beam size illuminated on the scanner 50. The condensing lens 40 can consist of one lens or combination of several lenses and can be included in the illumination system 10. When the condensing lens 40 reduces a beam size illuminated on the scanner 50, the size of the mirror planes of the scanner 50, e.g., an MEMS scanner can be reduced even more.

A resolution enhancing effect in the inventive optical scanning imaging system will be described below using the case where in which the imaging beam incident on the scanner 50 becomes a non-parallel beam focused on the first focus plane P1 before the non-linear optical element 70.

Figure 6:
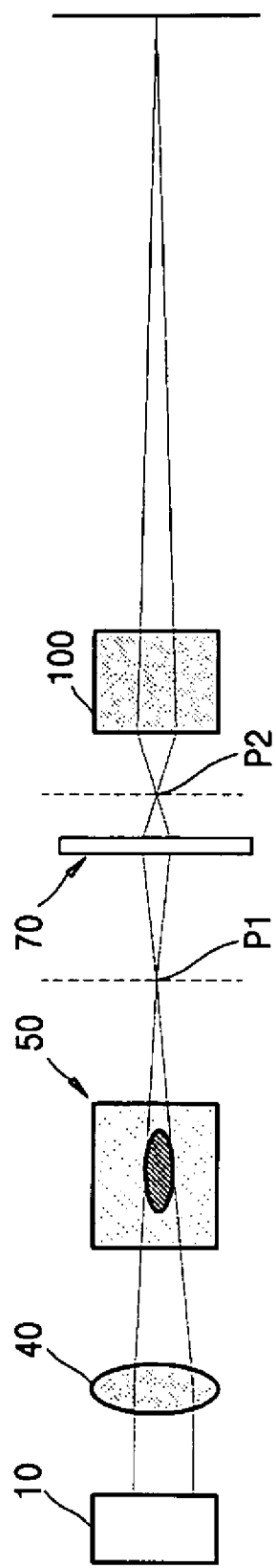
FIGS. 6 and 7 are a plan view and a side view exemplarily illustrating an optical path of an imaging beam in an optical scanning imaging system according to embodiments of the present invention.
Figure 7:
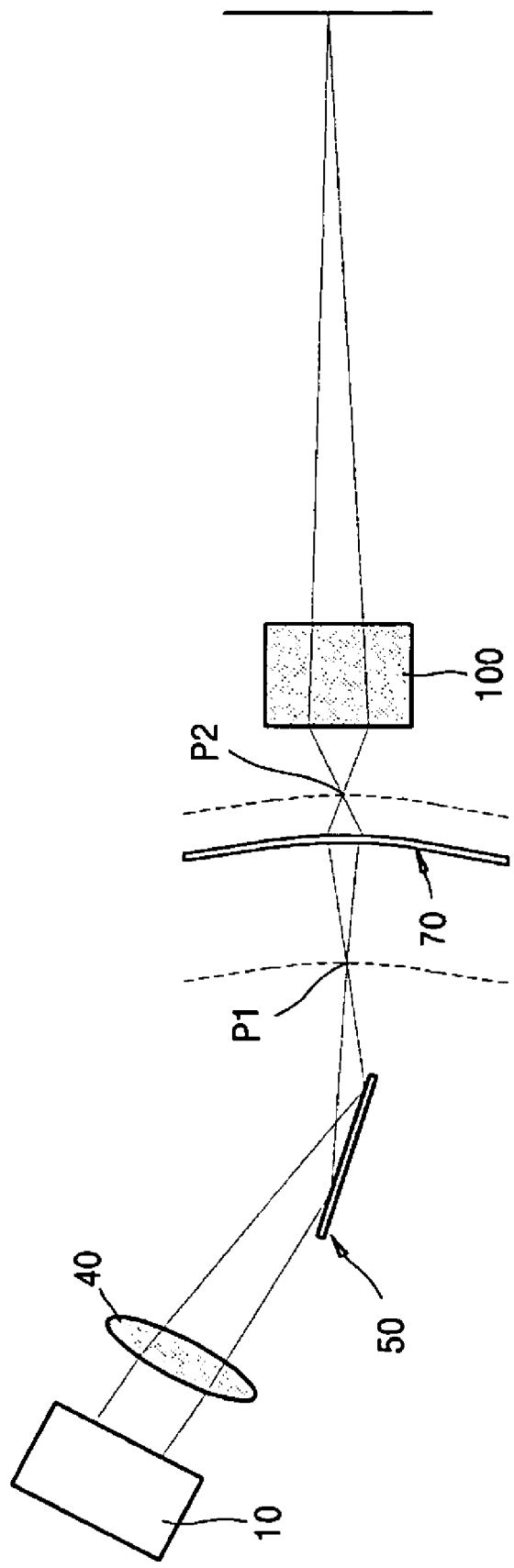

FIGS. 6 and 7 are a plan view and a side view exemplarily illustrating an optical path of an imaging beam in an optical scanning imaging system according to the present invention. The pumping light source 30, the pumping beam cutter 90, and the pumping beam are omitted for convenience.

Referring to FIGS. 6 and 7, a visual laser beam illuminated from the illumination system 10 is focused on the first focus plane P1 by the condensing lens 40.

By a lens effect obtained by illuminating the pumping beam, the non-linear optical element 70 focuses the diverging beam passing through the first focus plane P1 on the second focus plane P2 to be a beam waist smaller than a beam waist in the first focus plane P1.

Figure 8:
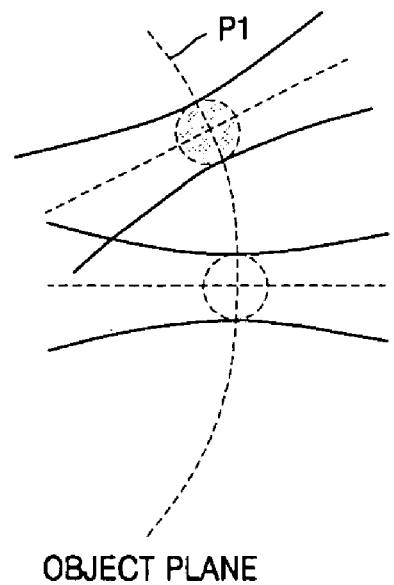
FIG. 8 is a view illustrating a beam waist in the first focus plane P1 in the case where a non-linear optical element is not provided.
Figure 9:
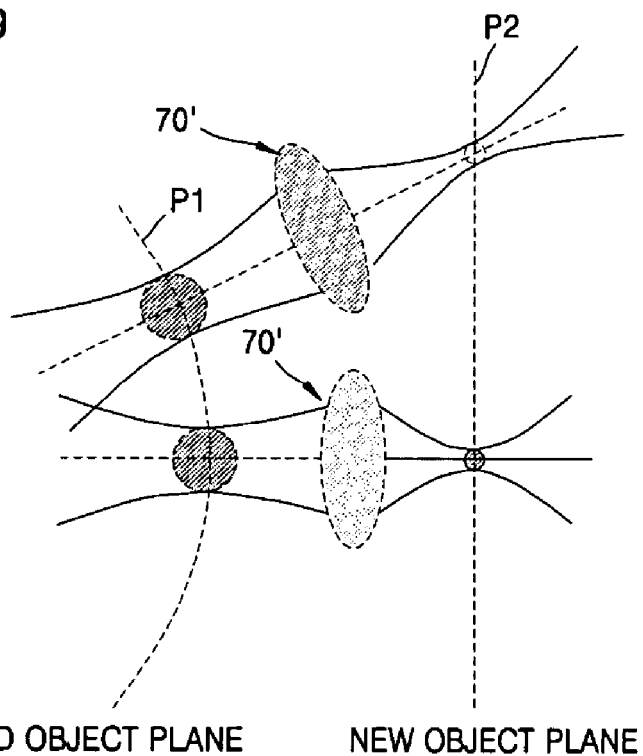
FIG. 9 is a view illustrating that a beam waist in the second focus plane P2, which is a position of a focal point of a non-linear optical element reduces compared with a beam waist in the first focus plane P1 in the case where a non-linear optical element is provided.

At this point, as is revealed from comparisons of FIGS. 8 and 9, when the non-linear optical element 70 is provided, the beam waist in the second focus plane P2 can be reduced compared with the beam waist in the first focus plane P1, so that a minimum unit pixel size can be made small and thus resolution enhances, in comparison with not using the non-linear optical element 70.

FIG. 8 is a view illustrating a beam waist in the first focus plane P1 in the case where a non-linear optical element 70 is not provided. FIG. 9 is a view illustrating that a beam waist in the second focus plane P2, which is a position of a focal point of a non-linear optical element 70 reduces compared with a beam waist in the first focus plane P1 in the case where a non-linear optical element 70 is provided.

In FIG. 8, the first focus plane P1 is an object plane. In FIG. 9, the second focus plane P2 is an object plane. That is, the first focus plane P1 is an old object plane when the non-linear optical element 70 is not provided and the second focus plane P2 is a new object plane obtained when the non-linear optical element 70 is provided between the first focus plane P1 and the projection optical system 100.

At this point, according to the inventive optical scanning imaging system, the focal length of a lens 70' formed by the non-linear optical element 70 is changed depending on a position from the central axis by adjusting the intensity of the pumping beam illuminated on the non-linear optical element 70 using the pumping beam modulator 35 as illustrated in FIG. 9, the second focus plane P2 can form the same plane as the image plane, e.g., a screen, so that the spot size formed on the image plane past the focus plane P2 by the projection optical system 100 can be maintained constant. In FIG. 9, the lens 70' is a virtually illustrated lens formed by the non-linear optical element 70.

The second focus plane P2 is an object plane on which, for example, an LCD imager of an LCD projector is disposed. A virtual image realized on the second focus plane P2 is formed on the screen by an image relay optical system applied as the projection optical system 100. The screen corresponds to a general screen showing a projection image of the projection apparatus. Also, when the projection apparatus is a head-mount type, the screen corresponds to the retina of a user.

Here, in the case where the non-linear optical element 70 is not provided, the first focus plane P1 is an object plane and a plane on which an LCD imager of an LCD projector is disposed.

According to the inventive optical scanning imaging system, since the beam waist of a light beam focused on an object plane by the non-linear optical element 70 can be reduced even more, a minimum unit pixel size can be reduced and thus resolution can be enhanced without increasing the size of the scanning plane of the scanner 50.

The inventive optical scanning imaging system can improve resolution without increasing the size of the scanning plane by providing the non-linear optical element made of a material having a Kerr effect and forming a lens automatically aligned while following a path of an imaging beam scanned by the scanner between the scanner and the projection optical system.

Therefore, according to the present invention, it is possible to increase resolution without limitation in the physical size of the scanner.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical scanning imaging system comprising:
   an illumination system emitting an imaging beam;
   a scanner scanning the beam incident from the illumination system;
   a non-linear optical element made of a material having a Kerr effect and forming a lens automatically aligned while following a path of the imaging beam scanned by the scanner; and
   a pumping light source causing non-linear optical refractive index change that forms the lens in the non-linear optical element while following the path of the imaging beam by activating the non-linear optical element.

2. The optical scanning imaging system of claim 1, wherein the non-linear optical element has a shape following an arc of a circle whose center coincides with a center of an axis of the scanner.

3. The optical scanning imaging system of claim 2, wherein the pumping light source is a laser light source.

4. The optical scanning imaging system of claim 2, wherein a pumping beam emitted from the pumping light source is incident to the scanner through the same optical path as that of the imaging beam.

5. The optical scanning imaging system of claim 2, wherein the pumping light source emits a pumping beam of a wavelength different from a wavelength of the imaging beam emitted from the illumination system.

6. The optical scanning imaging system of claim 2, further comprising:
   a pumping beam modulator disposed on a path of a pumping beam emitted from the pumping light source and modulating an intensity of the pumping beam so as to adjust a focal length of the lens formed by the non-linear optical element.

7. The optical scanning imaging system of claim 2, further comprising:
   a pumping beam cutter removing a pumping beam emitted from the pumping light source and passing through the non-linear optical element.

8. The optical scanning imaging system of claim 2, further comprising:
   a condensing lens reducing a size of a beam illuminated to the scanner on an optical path before the scanner.

9. The optical scanning imaging system of claim 1, wherein the pumping light source is a laser light source.

10. The optical scanning imaging system of claim 1, wherein a pumping beam emitted from the pumping light source is incident to the scanner through the same optical path as that of the imaging beam.

11. The optical scanning imaging system of claim 1, wherein the pumping light source emits a pumping beam of a wavelength different from a wavelength of the imaging beam emitted from the illumination system.

12. The optical scanning imaging system of claim 1, further comprising:
a pumping beam modulator disposed on a path of a pumping beam emitted from the pumping light source and modulating an intensity of the pumping beam so as to adjust a focal length of the lens formed by the non-linear optical element.

13. The optical scanning imaging system of claim 1, further comprising:
a pumping beam cutter removing a pumping beam emitted from the pumping light source and passing through the non-linear optical element.

14. The optical scanning imaging system of claim 1, further comprising:
a condensing lens reducing a size of a beam illuminated to the scanner on an optical path before the scanner.

15. The optical scanning imaging system of claim 1, further comprising:
a pumping beam modulator disposed on a path of a pumping beam emitted from the pumping light source and modulating an intensity of the pumping beam so as to adjust a focal length of the lens formed by the non-linear optical element; and
a pumping beam cutter removing a pumping beam emitted from the pumping light source and passing through the non-linear optical element.

16. The optical scanning imaging system of claim 1, wherein the illumination system is a laser illumination system using a laser light source.

17. The optical scanning imaging system of claim 16, wherein the illumination system is formed to emit a plurality of laser beams for each wavelength including R, G, and B laser beams modulated according to an image signal through a single optical path.

18. An optical apparatus comprising the optical scanning imaging system of claim 1.

19. The apparatus of claim 18, wherein the non-linear optical element has a shape following an arc of a circle whose center matches with a center of an axis of the scanner.

20. The apparatus of claim 19, wherein the pumping light source is a laser light source.

21. The apparatus of claim 19, wherein a pumping beam emitted from the pumping light source is incident to the scanner through the same optical path as that of the imaging beam.

22. The apparatus of claim 19, wherein the pumping light source emits a pumping beam of a wavelength different from a wavelength of the imaging beam emitted from the illumination system.

23. The apparatus of claim 19, further comprising:
a pumping beam modulator disposed on a path of a pumping beam emitted from the pumping light source and modulating an intensity of the pumping beam so as to adjust a focal length of the lens formed by the non-linear optical element.

24. The apparatus of claim 19, further comprising:
a pumping beam cutter removing a pumping beam emitted from the pumping light source and passing through the non-linear optical element.

25. The apparatus of claim 19, further comprising:
a condensing lens reducing a size of a beam illuminated to the scanner on an optical path before the scanner.

26. The apparatus of claim 18, wherein the pumping light source is a laser light source.

27. The apparatus of claim 18, wherein a pumping beam emitted from the pumping light source is incident to the scanner through the same optical path as that of the imaging beam.

28. The apparatus of claim 18, wherein the pumping light source emits a pumping beam of a wavelength different from a wavelength of the imaging beam emitted from the illumination system.

29. The apparatus of claim 18, further comprising:
a pumping beam modulator formed on a path of a pumping beam emitted from the pumping light source and modulating an intensity of the pumping beam so as to adjust a focal length of the lens formed by the non-linear optical element.

30. The apparatus of claim 18, further comprising:
a pumping beam cutter removing a pumping beam emitted from the pumping light source and passing through the non-linear optical element.

31. The apparatus of claim 18, further comprising:
a condensing lens reducing a size of a beam illuminated to the scanner on an optical path before the scanner.

32. The apparatus of claim 18, further comprising:
a pumping beam modulator disposed on a path of a pumping beam emitted from the pumping light source and modulating an intensity of the pumping beam so as to adjust a focal length of the lens formed by the non-linear optical element; and
a pumping beam cutter removing a pumping beam emitted from the pumping light source and passing through the non-linear optical element.

33. The apparatus of claim 18, wherein the illumination system of the optical scanning imaging system is a laser illumination system using a laser light source.

34. The apparatus of claim 18, wherein the illumination system is formed to emit a plurality of laser beams for each wavelength including R, G, and B laser beams modulated according to an image signal through a single optical path.

35. The apparatus of claim 18, wherein the apparatus is one of an optical scanning apparatus and a projection apparatus forming a projection image.

* * * * *